INVENTORS
WILLIAM A. SCHEUBLEIN JR.
WILLIE C. UNRUH
DAN W. PENISTON

BY
*Gravely, Lieder & Woodruff*

ATTORNEYS

Oct. 27, 1964  W. A. SCHEUBLEIN, JR., ETAL  3,154,332
BALL JOINT ASSEMBLY

Filed Jan. 5, 1962  3 Sheets-Sheet 2

INVENTORS
WILLIAM A. SCHEUBLEIN JR.
WILLIE C. UNRUH
DAN W. PENISTON
BY
Gravely, Lieder & Woodruff
ATTORNEYS 3,154,332
BALL JOINT ASSEMBLY
William A. Scheublein, Jr., St. Louis, Mo., and Willie C. Unruh and Dan W. Peniston, Wichita, Kans., assignors to Moog Industries, Inc., St. Louis, Mo., a corporation of Missouri
Filed Jan. 5, 1962, Ser. No. 164,524
5 Claims. (Cl. 287—87)

This invention relates to improvements in ball joints for vehicle wheel suspensions and is particularly directed to a simple arrangement of components which cooperate to greatly broaden the service utility of the assembly.

An important object of this invention is to provide a ball joint assembly capable of use either in a compression or tension mounting arrangement for vehicle wheel suspension systems.

It is also an object of this invention to provide a unique organization of components for ball joints in which the configuration of certain components permits the ball joints to be used under tension or compression and results in economies of manufacture.

Other objects and certain advantages of the present invention will be more particularly pointed out in connection with a preferred embodiment which broadly comprises a housing enclosing a composite ball head capable of sustaining principal wheel suspension loads in tension or compression. The composite ball head in the preferred form includes similar bearing members mounted on a stud head formed with opposed seats of substantially similar form, and resilient means selectively cooperative with the bearing members to pre-load the composite ball head so that production tolerance and service wear are controlled effectively, and in a simple manner.

With these objectives in view, the preferred form of the invention will be hereinafter disclosed in connection with the accompanying drawings, wherein.

Figure 1:
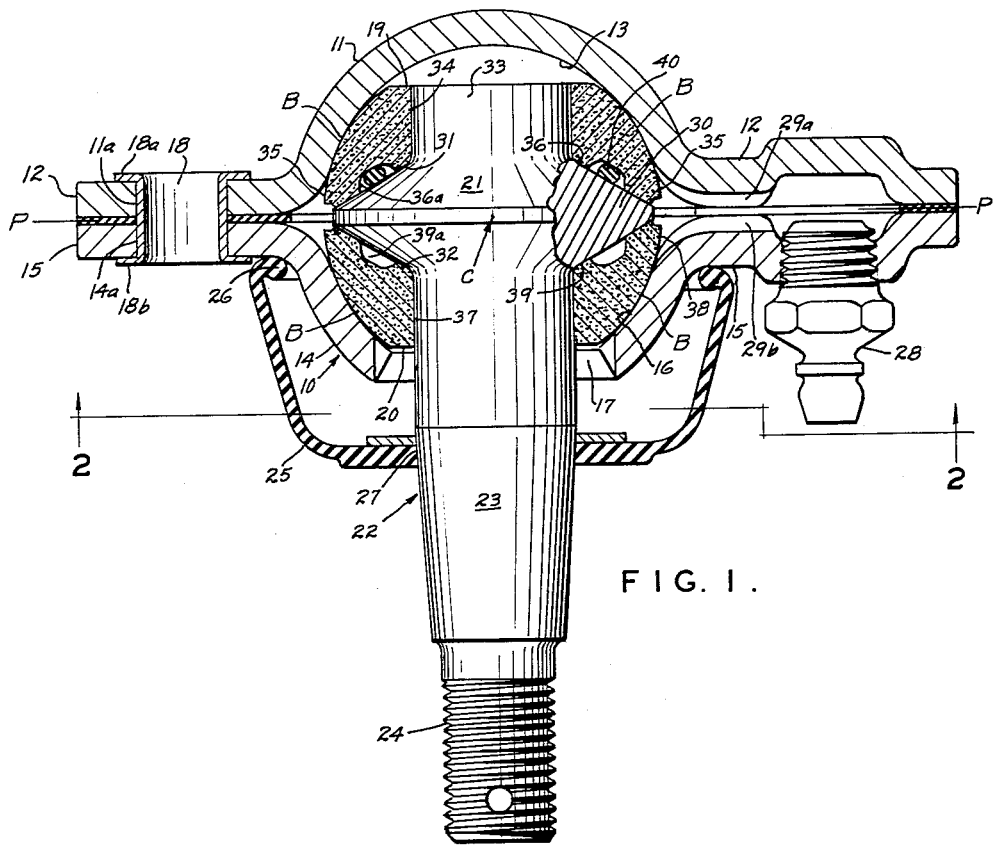
FIG. 1 is a longitudinal sectional elevation of the ball joint assembly organized for tension mounting in a vehicle wheel suspension assembly.

The ball joint of this invention is adapted for use in vehicle wheel suspension assemblies such as has been illustrated in U.S. Patent No. 2,954,993, granted on October 4, 1960. In its application for use in connection with such prior disclosure, the present invention (FIG. 1) is seen to include a ball joint 10 having an upper housing part 11 formed with a flanged portion 12 and a semi-spherical bearing cavity 13. A cooperating lower housing part 14 having a flanged portion 15 and a semi-spherical bearing cavity 16 is formed with an aperture 17 which may have a certain amount of elongation in one direction (FIG. 2) to provide a slot-like opening for a purpose to be described. The housing parts 11 and 14 are secured in assembled relation by forming aligned apertures 11a and 14a in such parts respectively and setting eyelets or grommets 18 in the apertures such that the eyelet flanges 18a and 18b embrace the flanges 12 and 15. The eyelets 18 have a through-bore so that attachment bolts, rivets, or the like (not shown) may be easily inserted to secure the ball joint 10 in assembly on the vehicle.

Within the assembled housing parts 11 and 14 there is operatively disposed a composite ball head made up of an upper bearing member 19, a lower bearing member 20 and a head 21 of a load transmitting stud 22. The stud 22 has its shank 23 extending through the aperture 17 of the housing part 14 so that the end portion 24 may be connected to a part of the wheel suspension system (not shown). The stud shank 23 is free to swing about the center of oscillation C of the composite ball head and has its greatest degree of motion in the direction of elongation of aperture 17.

The composite ball head within the ball joint 10 is protected by a suitable dust seal 25 in which the annular lip 26 snugly engages the housing part 14 and the aperture 27 embraces the stud shank 23. Lubrication for the bearing members is supplied by a suitable lube fitting 28 opening to a passage made up of matching channel-like grooves 29a and 29b formed in the respective flanges 12 and 15. The grooves conduct the lubricant into the bearing cavities along the parting plane P—P of the ball joint housing parts 11 and 14 so that its distribution to both bearing members is assured. In certain conditions of mounting of the ball joint 10 the lube fitting 28 may be threaded into the upper housing 11, opposite the position shown, or in some other position.

Since the presently preferred form of ball joint 10 is intended to serve either as a tension loaded or compression loaded device certain new and unique features have been provided to make the alternate service use possible. The tension and compression loads transmitted through the stud 22 are provided for by forming the stud head with an enlarged portion 30 having annular sloping seats 31 and 32 which converge toward the outer extremity of the portion 30 from the axial centerline of the stud 22. This form of stud head provides great shear strength across the innermost zone of seats 31 and 32. The annular seat 31 is adjacent an extension 33 on the upper end of the stud and the annular seat 32 is adjacent the stem 23. The seats 31 and 32 carry the bearing members 19 and 20 respectively, each bearing member in the selected embodiments being substantially similar, though this is not necessary or required. The member 19 is formed with a central opening 34 to receive the stud projection 33, and with an outer semi-spherical bearing face 35. The inner surface 36 of the member is substantially cone-shaped to agree with the annular seat 31 on the stud head 21. An annular recess 36a is provided in the cone-shaped surface 36 for a purpose to be noted. The other bearing member 20 is formed with an axial bore 37, an outer semi-spherical bearing face 38, an inner cone-shaped surface 39 and an annular recess 39a in the latter surface. The cone-shaped surface 39 matches the seat 32 on the stud head.

Figure 2:
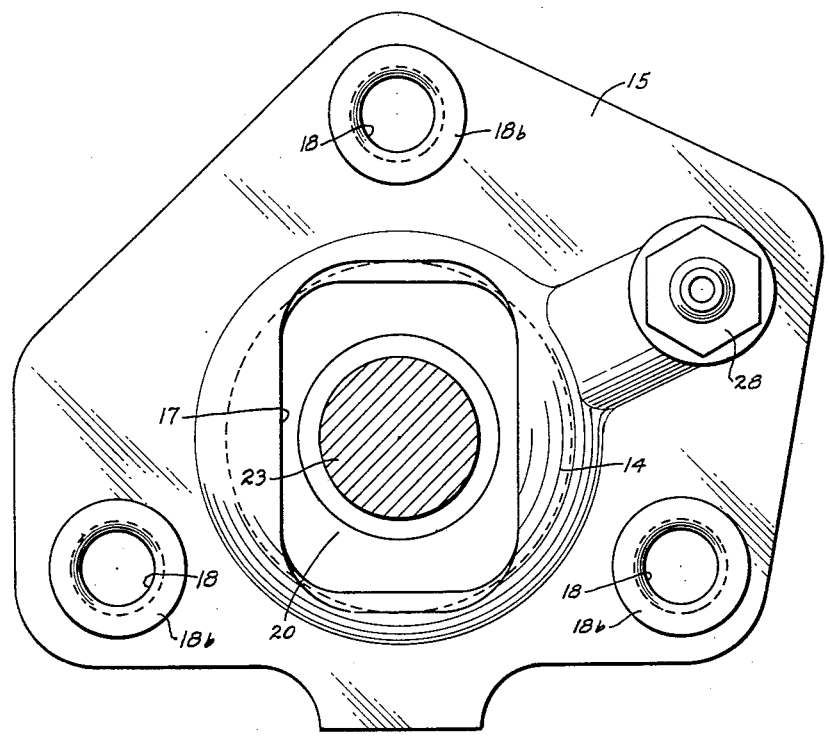
FIG. 2 is a transverse sectional view taken along line 2—2 in FIG. 1.
Figure 6:
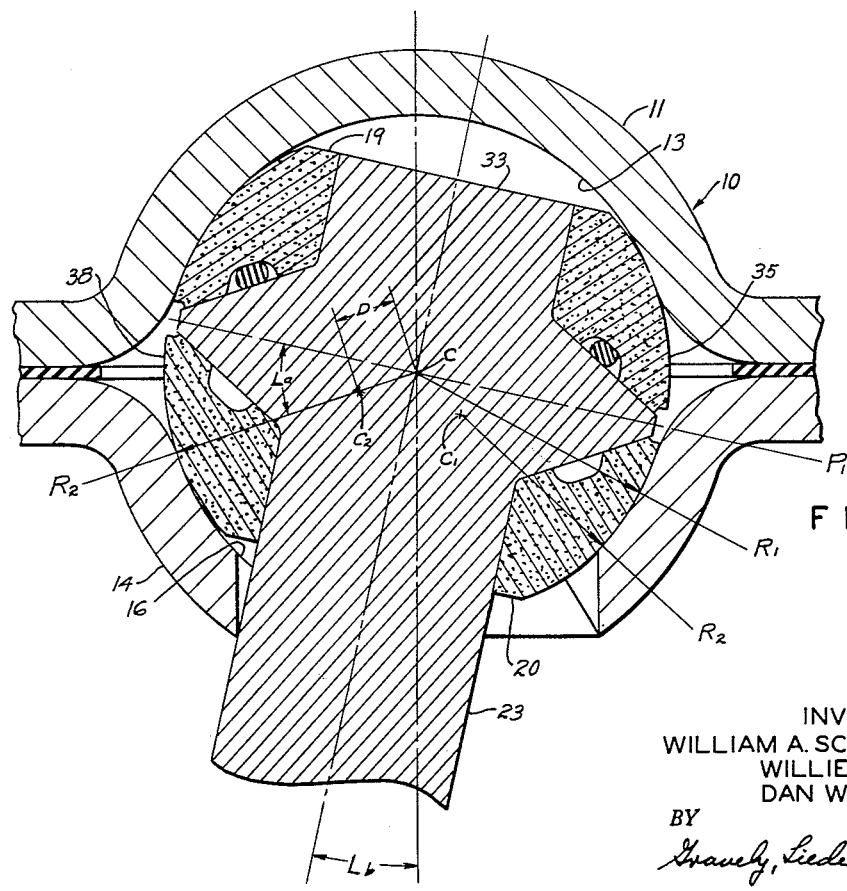
FIG. 6 is a view of portions of the ball joint of FIG. 1 to illustrate the geometry and mathematical relationship of the parts.

In the assembly of FIG. 1 it is observed that the composite ball head has the bearing members 19 and 20 carried upon the stud head seats 31 and 32 respectively, thereby presenting the bearing face 35 to the bearing cavity 13 and bearing face 38 to the bearing cavity 16. Oscillation of the stud 22 occurs about the center C which is substantially the geometric center of the housing cavities 13 and 16 and is generally located on the parting plane P—P. Each bearing member 19 or 20, and substantially as shown in FIG. 6 for member 20, only has its semi-spherical face formed from a center which is developed from the center point C but utilizes a lesser radius so that the curvature of the respective faces is less than the curvature of the respective cavities. Thus surfaces on each member precisely match surfaces in the respective cavities only at a line or tangent contact. This lesser radius is developed mathematically, based on the angular amount of stud swing so that most of the tangent line of contact does not pass into the aperture 17 of housing 14 when stud 23 has moved to maximum angular stud swing. Thus in FIG. 6, the bearing member 20 has its surface 38 constructed from the center C, so that its radius $R_2$ is less than the radius $R_1$ for the cavity 16 whose center is at C. Since the member has a center $C_1$ different from the geometric center C, it follows that the center $C_1$ is defined by an annular trace which also passes through center $C_2$ on the diametrically opposite side from center $C_1$. As the radius line $R_2$ passes through C and $C_2$ it forms the angle $La$ with the parting plane P—P which locates the tangent contact line B (FIG. 1). The centers C and $C_1$, $C_2$ are spaced a distance D which is the resultant of radius $R_1$ less radius $R_2$, or $R_1$ is the sum of $R_2$ plus D. The resulting working fit of the bearing faces in the respective housing cavities is such that as wear occurs on the line contact B the line widens out to form a larger area of contact. As the contact area widens and increases the rate of wear decreases, such action being initially referred to as "break-in" wear. The initial or new condition of line or tangent contact is shown in FIG. 1 with each of the contact zones indicated at B.

As the stud 23 swings through an angle $Lb$ about center C, the tangent contact zones B move over the cavities 13 and 16, and for cavity 16 it is not desirable to have the zone B move into the opening 17, except under extreme conditions in service.

The manufacture of ball joints produces a certain looseness due to the tolerance and dimensional difference which exists between seemingly identical parts in a group of finished products. In ball joints this tolerance variation is noticeable in the end play movement which can be felt by moving the stud 22 axially while holding the housing parts 11 and 14 stationary. Wear adds to the end play looseness and leads to knocking as the vehicle wheel loads vary or reverse from positive to negative. The looseness also develops a mushy feel in steering which is objectionable and unsafe.

Figure 3:
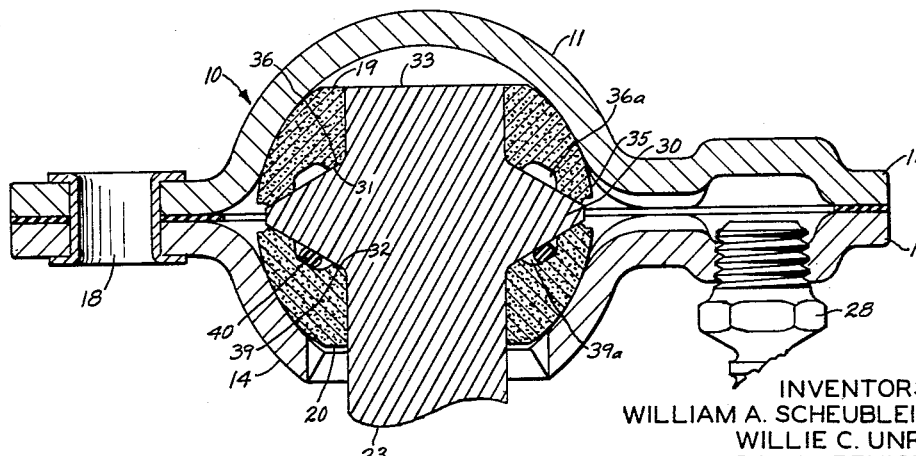
FIG. 3 is a view similar to FIG. 1 but showing the ball joint assembly organized for compression mounting.

End play looseness is controlled by the incorporation of a resilient member or O ring 40 in the recess 36a or 39a of the bearing members 19 or 20 respectively, depending upon whether the ball joint is used principally in compression or in tension. If the use is in tension the resilient member 40 is placed in the upper bearing recess 36a so that its initial stress or squeeze due to placement of the parts in assembly will add a force to the direction of the tension load and, at the same time, force the bearing member 19 against the cavity 13. As force reversals occur, the resilient member 40 is, more or less compressed, thereby keeping an active force or load on the parts of the composite head to take up wear and to substantially prevent looseness. When the ball joint is to be used for compression mounting (FIG. 3), the resilient member 40 is placed in the recess 39a of the lower bearing member 20. Its function is substantially the same as above described. In other respects FIG. 3 is similar to FIG. 1 and like numerals of reference have been used to indicate the parts thereof.

Figure 4:
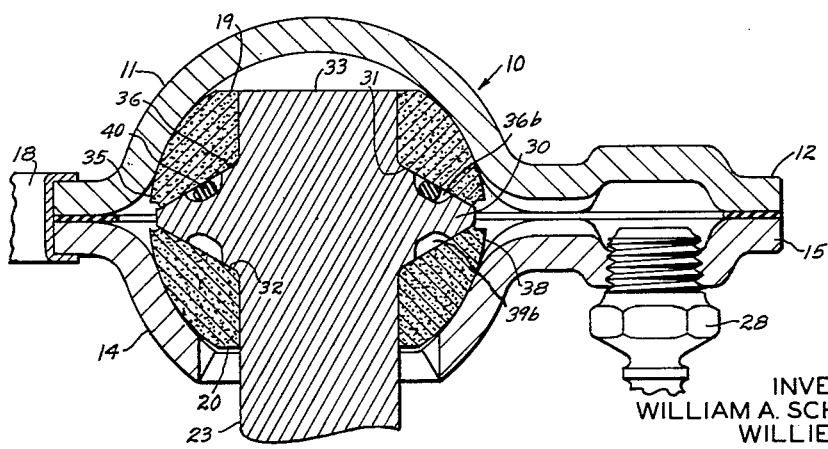
FIG. 4 is a view similar to FIG. 1, but showing a variant in the arrangement of parts in a ball joint assembly herein preferred.
Figure 5:
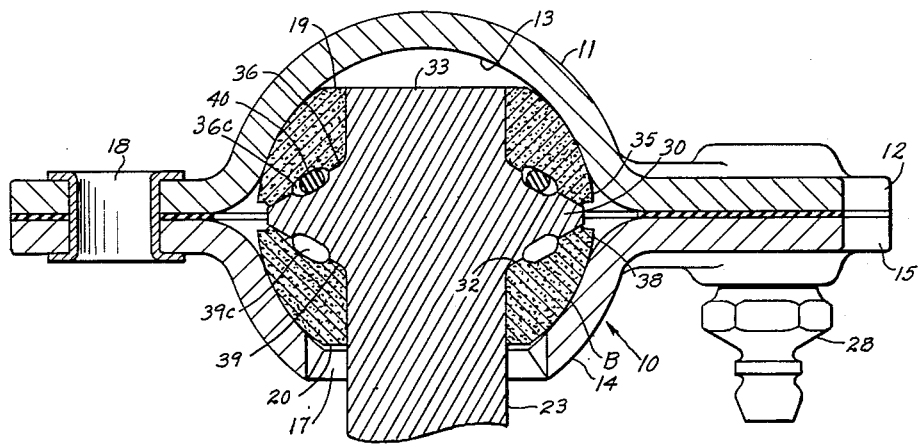
FIG. 5 is a view similar to FIG. 1, but showing a further variant of the ball joint assembly herein preferred.

While the resilient member 40 has been shown as an O-ring, any other form may be used, the same being limited to a volume which is less than the volume of the recess 36a or 39a in which it is placed. An alternate mounting of resilient member 40 is shown in FIG. 4 wherein the recesses 36a and 39a are eliminated and recesses 36b and 39b are formed in the seats 31 and 32 of the stud head 21. It is appreciated that the same type of recess may be formed partly in the bearings and in the stud head seats, as is seen in FIG. 5, and that the function will not be affected thereby. In the latter view, the bearing seat 31 and cone surface 36 each carry a portion of a recess 36c, and similarly the seat 32 and cone surface 39 each carry a portion of a recess 39c.

The foregoing description has related to a preferred form of ball joint assembly, and to certain modifications, in which there is the new and unique result that one type of ball joint can be used in both tension and compression mountings. Heretofore, the character of structure in the ball joint dictated whether it could be used for compression or for tension mounting. Now, the same type of structural characteristics in ball joint may be relied upon, merely by placing the resilient member 40 in one or the other of two positions.

While a preferred form of the present invention has been disclosed and described in detail, it is understood that the same may be modified or altered in certain respects without departing from the underlying principles of the improvement. It is, therefore, the aim to cover all such modifications and alterations which it is possible to include within the scope of the appended claims.

What is claimed is:

1. A ball joint for use in vehicle wheel suspension assemblies to selectively connect a vehicle wheel for principal tension or compression loading in the ball joint, the ball joint including a housing having means to connect it to one part of the suspension assembly and being internally formed with spaced semi-spherical bearing surfaces having a radius of curvature taken from a common center, one of said bearing surfaces having an aperture therethrough, a stud in said housing formed with an enlarged portion defined by outwardly converging annular sloping seats on opposite sides of a parting plane normal to the longitudinal axis of said stud and intersecting the common center for said housing bearing surfaces, a projection extending from one sloping seat in the axis of said stud and a shank projecting from the other sloping seat in the axis of said stud, said shank and axial projection being the same size in diameter and said shank extending through said housing aperture and having an exposed end for connection to another part of the suspension assembly, upper and lower interchangeable bearing members on either side of said enlarged portion each having an inwardly directed sloping surface complemental to and engaging said sloping seats and each having a central opening to receive respectively said axially extending projection and said shank, and on which said bearing members are able to rotate and to slide in axial directions on said stud, the connection of said housing to one part and said shank to another part of the suspension assembly normally imposing the principal load in the ball joint between said enlarged portion of said stud and one of said bearing members when in direct abutment, resilient means disposed between the other of said bearing members and its engaging sloping seat under initial compression so as to force said other bearing member into engagement upon the adjacent housing bearing surface to damp axial end play in said stud upon loading experienced in the ball joint reverse to the principal load, and depression means in at least a part of the structure constituting said sloping seats on the stud member and the engaging sloping surfaces on the upper and lower bearing members for retaining the resilient means between either of said bearing members and the respective side of the enlarged portion.

2. The ball joint set forth in claim 1, wherein one of said other of said bearing members and its engaging sloping seat being formed with a recess to receive said resilient means and maintain its position therebetween.

3. The ball joint set forth in claim 1, wherein each of said bearing members is formed with an outer semi-spherical surface having a radius of curvature with its center off-set from said common center for said housing bearing surfaces and located to one side of said parting plane.

4. The ball joint set forth in claim 1, wherein each of said bearing members is formed with a cone-shaped surface substantially matching its sloping seat on said stud enlarged portion and with an outer semi-spherical surface having a radius of curvature less than the radius of curvature of the adjacent housing bearing surface about said common center, the radius of curvature for each of said bearing member semi-spherical surfaces being measured from a center off-set from said common center and to the adjacent side of said parting plane.

5. A ball joint construction for connecting a vehicle wheel into a suspension assembly in which the ball joint is adapted to sustain a principal load that can be selectively tension and compression due to load reversals in vehicle operation, said ball joint including a housing having means to connect it to one part of the wheel suspension, said housing having spaced semi-spherical bearing surfaces therein with radii of curvature taken about a substantially common center, one of said bearing surfaces having an aperture therethrough, a load transmitting stud having a headed end in said housing and a shank projecting through said one bearing surface aperture for connection to another part of the wheel suspension, said headed end comprising a pair of symmetrically related seats of generally cone-shaped configuration in back to back relation forming an annular projection spaced inwardly from the terminus of said headed end, the parting plane between said seats intercepting said common center for said semi-spherical bearing surfaces, upper and lower interchangeable bearing members on either side of the headed end of said stud each having an inwardly directed generally cone-shaped surface complemental to and engaging the seats on the stud, and each having an outer semi-spherical surface formed with the radius of curvature less than the radius of curvature of said housing semi-spherical bearing surfaces, and being complemental to and engaging said bearing surfaces, a resilient element disposed between one of said seats and the bearing member engaging said one seat to add a force in the direction of the principal loading thus urging the other seat against the other bearing and holding said stud in alignment within said housing, said resilient element yielding on reversal of loading thus permitting the engaging bearing member to retain the alignment, and depression means in at least a part of the structure constituting said cone-shaped seats on the stud member and the engaging surfaces on the upper and lower bearing members for retaining the resilient member between either of said bearing members and the respective side of the annular projection.

References Cited in the file of this patent
UNITED STATES PATENTS

| | | |
|---|---|---|
| 1,152,941 | Goddard | Sept. 7, 1915 |
| 2,096,966 | Hufferd | Oct. 26, 1937 |
| 2,176,519 | Anderson | Oct. 17, 1939 |
| 2,491,085 | Burrows | Dec. 13, 1949 |
| 2,645,510 | Booth | July 14, 1953 |
| 2,754,141 | Latzen | July 10, 1956 |
| 2,797,930 | Booth | July 2, 1957 |
| 2,924,469 | Moskovitz | Feb. 9, 1960 |
| 2,942,901 | Booth | June 28, 1960 |
| 3,073,617 | Schultz | Jan. 15, 1963 |

FOREIGN PATENTS

| | | |
|---|---|---|
| 1,156,017 | France | Dec. 9, 1957 |
| 819,733 | Great Britain | Sept. 9, 1959 |